US011438828B2

(12) United States Patent
Sapra et al.

(10) Patent No.: US 11,438,828 B2
(45) Date of Patent: Sep. 6, 2022

(54) METHODS, SYSTEMS, AND COMPUTER READABLE MEDIA FOR PROVIDING NETWORK FUNCTION DISCOVERY SERVICE ENHANCEMENTS

(71) Applicant: Oracle International Corporation, Redwood Shores, CA (US)

(72) Inventors: Kawal Sapra, Bangalore (IN); Venkatesh Aravamudhan, Bangalore (IN); Raghuvamshi vasudev Singh Thakur, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/942,713

(22) Filed: Jul. 29, 2020

(65) Prior Publication Data

US 2022/0038999 A1 Feb. 3, 2022

(51) Int. Cl.
*H04W 48/16* (2009.01)
*H04W 48/18* (2009.01)
(Continued)

(52) U.S. Cl.
CPC ......... *H04W 48/16* (2013.01); *H04L 41/0893* (2013.01); *H04L 67/16* (2013.01); (Continued)

(58) Field of Classification Search
CPC ..... H04W 48/16; H04W 48/18; H04W 60/00; H04W 84/042; H04L 67/16; H04L 41/0893
See application file for complete search history.

(56) References Cited

U.S. PATENT DOCUMENTS 10,772,062 B1 9/2020 Albasheir et al.
2019/0230556 A1 7/2019 Lee
(Continued)

FOREIGN PATENT DOCUMENTS

WO WO 2019/193129 A1 10/2019

OTHER PUBLICATIONS

Notification of Transmittal of the International Search Report and the Written Opinion of the International Searching Authority, or the Declaration for U.S. Patent Application Serial No. PCT/US2021/020122 (dated Jun. 1, 2021).
(Continued)

*Primary Examiner* — Diane D Mizrahi
(74) *Attorney, Agent, or Firm* — Jenkins, Wilson, Taylor & Hunt, P.A.

(57) ABSTRACT

A method for providing network function (NF) discovery service enhancements includes receiving, by an NF repository function (NRF) from a consumer NF, a NF discovery request message that requests discovery of a network service hosted by producer NFs and includes at least one of a maximum payload size parameter and a profile count limit parameter and obtaining, by the NRF, NF profile objects corresponding to producer NFs that host the network service. The method further includes in response to determining that the consumer NF supports conditional limit features based on the at least one of the maximum payload size parameter and the profile count limit parameter, providing by the NRF to the consumer NF, a number of the NF profile objects that adheres to the at least one of the maximum payload size parameter and the profile count limit parameter indicated in the NF discovery request message.

20 Claims, 4 Drawing Sheets

400

(51) Int. Cl.
*H04L 29/08* (2006.01)
*H04W 60/00* (2009.01)
*H04L 12/24* (2006.01)
*H04W 84/04* (2009.01)
*H04L 67/51* (2022.01)
*H04L 41/0893* (2022.01)

(52) U.S. Cl.
CPC .......... *H04W 48/18* (2013.01); *H04W 60/00* (2013.01); *H04W 84/042* (2013.01)

(56) References Cited

U.S. PATENT DOCUMENTS

| | | | | |
|---|---|---|---|---|
| 2019/0357216 | A1* | 11/2019 | Jung | H04W 48/16 |
| 2020/0137174 | A1 | 4/2020 | Stammers et al. | |
| 2020/0404608 | A1 | 12/2020 | Albasheir et al. | |
| 2021/0044481 | A1 | 2/2021 | Xu et al. | |

OTHER PUBLICATIONS

Notification of Transmittal of the International Search Report and the Written Opinion of the International Searching Authority, or the Declaration for U.S. Patent Application Serial No. PCT/US2021/020121 (dated Jun. 1, 2021).
Notice of Allowance and Fee(s) Due for U.S. Appl. No. 17/001,599 (dated May 17, 2021).
Applicant-Initiated Interview Summary for U.S. Appl. No. 17/001,599 (dated May 5, 2021).
"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Huawei, "eSBA: reselection of producer instance," 3GPP TSG-SA2 Meeting #132, pp. 1-2 (Apr. 12, 2019).
Docomo, "Update Solution 4 for implicit registration," SA WG2 Meeting #129, pp. 1-2 (Oct. 15-19, 2018).
"3rd Generation Partnership Project; Technical Specification Group Services and System Aspects; Procedures for the 5G System (5GS); Stage 2 (Release 16)," 3GPP TS 23.502, V16.5.0, pp. 1-594 (Jul. 2020).
"3rd Generation Partnership Project; Technical Specification Group Services and System Aspects; System architecture for the 5G System (5GS); Stage 2 (Release 16)," 3GPP TS 23.501, V16.5.0, pp. 1-441 (Jul. 2020).
"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).
Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Commonly-Assigned, co-pending U.S. Appl. No. 17/001,599 for "Methods, Systems, and Computer Readable Media for Optimized Network Function (NF) Discovery and Routing Using Service Communications Proxy (SCP) and NF Repository Function (NRF)," (Unpublished, filed Aug. 24, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-192 (Jul. 2020).
"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).
"3rd Generation Partnership Project; Technical Specification Group Services and System Aspects; Procedures for the 5G System (5GS); Stage 2," 3GPP TS 23.502 V16.4.0 pp. 1-582 (Mar. 2020).
"3rd Generation Partnership Project; Technical Specification Group Core Network and Terminals; Numbering, addressing and identification; (Release 17)," 3GPP TS 23.003, V17.3.0, pp. 1-145 (Sep. 2021).
Commonly-Assigned, co-pending U.S. Appl. No. 17/497,879 for "Methods, Systems, and Computer Readable Media for Routing Inter-Public Land Mobile Network (INTER-PLMN) Messages Related to Existing Subscriptions with Network Function (NF) Repository Function (NRF) Using Security Edge Protection Proxy (SEPP)," (Unpublished, filed Oct. 8, 2021).
Commonly-Assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications via Service Communications Proxy (SCP)," (Unpublished, filed Aug. 3, 2021).
"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).
Commonly-Assigned, co-pending U.S. Appl. No. 17/193,337 for "Methods, Systems, and Computer Readable Media for Selecting Multiple Network Function Types Using a Single Discovery Request," (Unpublished, filed Mar. 5, 2021).
Notice of Allowance for U.S. Appl. No. 17/001,599 (dated Nov. 17, 2021).

* cited by examiner

300

302

```
"max_payload_size_list": [{
        "plmn": {"mcc": 100, "mnc": 20},
        "snssai": {"sst": 10, "sd": 2},
        "size": 1000
    },
    {
        "plmn": {"mcc": 200, "mnc": 10},
        "snssai": {"sst": 20, "sd": 3}
        "size": 124
    }]
"limit_list": [{
        "plmn": {"mcc": 100, "mnc": 20},
        "snssai": {"sst": 10, "sd": 2},
        "limit": 2
    },
    {
        "plmn": {"mcc": 200, "mnc": 10},
        "snssai": {"sst": 20, "sd": 3}
        "limit": 1
    }]
```

METHODS, SYSTEMS, AND COMPUTER READABLE MEDIA FOR PROVIDING NETWORK FUNCTION DISCOVERY SERVICE ENHANCEMENTS

TECHNICAL FIELD

The subject matter described herein relates to improving the network function (NF) service discovery operations in communications networks. More particularly, the subject matter described herein relates to methods, systems and computer readable media for providing NF discovery service enhancements.

BACKGROUND

In 5G telecommunications networks, the network node that provides service is referred to as a producer network function (NF). A network node that consumes services is referred to as a consumer NF. Moreover, a network function can operate as both a producer NF and a consumer NF depending on whether it is consuming or providing service.

A given producer NF may have many service endpoints, where a service endpoint is a combination of an Internet protocol (IP) address and a port number on a network node that hosts a producer NF. Producer NFs register with a network function repository function (NRF). The NRF maintains a NF profile of available NF instances and their supported services. Consumer NFs can subscribe with the NRF to receive information about producer NF instances that have registered with that NRF.

At present, the 3GPP architecture supports a NF discovery service operation (i.e., 'NFDiscover') that enables consumer NFs to discover the producer NFs from the NRF. Specifically, the NRF stores producer NF profiles (e.g., NF profile objects) and provides the NF profiles to requesting consumer NFs upon receiving discovery request messages. Likewise, it is assumed that 5G network deployments can span multiple public land mobile network (PLMN) sites and/or slices (e.g., logical network slices). Network functions can register themselves in different NRFs that are located in different PLMNs or slices. In the event a NFDiscover service operation is requested, the serving NRF will return target NF profiles (e.g., producer NF profile objects) located in different PLMNs and slices. However, the current 3GPP specification does not provide a mechanism for the consumer NF to limit the number of received producer NF profiles (e.g., associated with producer NFs from different PLMN sites or slices) that are provided in response to the discovery request or query. More specifically, there is no ability that permits a consumer NF to request producer NF profiles on the basis of the number of NF profiles and/or profile payload size associated with the discovered producer NFs located in a particular PLMN and slice.

Accordingly, there exists a need for methods, systems, and computer readable media for providing network function discovery service enhancements.

SUMMARY

A method for providing network function (NF) discovery service enhancements includes receiving, by a NF repository function (NRF) from a consumer NF, a NF discovery request message that requests discovery of a network service hosted by producer NFs in a 5G core network and includes at least one of a maximum payload size parameter and a profile count limit parameter and obtaining, by the NRF, NF profile objects corresponding to producer NFs that host the network service. The method further includes in response to determining that the consumer NF is configured to support conditional limit features based on the at least one of the maximum payload size parameter and the profile count limit parameter, providing by the NRF to the consumer NF, a number of the NF profile objects that adheres to the at least one of the maximum payload size parameter and the profile count limit parameter indicated in the NF discovery request message.

According to another aspect of the subject matter described herein, a method that further includes the consumer NF indicating support of the conditional limit features in a NF register message during a registration service operation.

According to another aspect of the subject matter described herein, a method that further includes the consumer NF indicating support of the conditional limit features in the NF discovery request message during a NF discovery service operation.

According to another aspect of the subject matter described herein, a method that further includes the NRF recording the consumer NF as being capable of supporting the conditional limit features in a registration record stored in a local NF profile repository.

According to another aspect of the subject matter described herein, a method that further includes the at least one maximum payload size parameter and the profile count limit parameter included in a header section of the NF discovery request message.

According to another aspect of the subject matter described herein, a method that further includes each of the maximum payload size parameter and the profile count limit parameter further restricted to a specified PLMN and/or network slice.

According to another aspect of the subject matter described herein, a method that further includes sending, by the NRF to the consumer NF, a NF discovery response message that includes one or more NF profile objects corresponding to NFs that support the network service in a specified PLMN and/or network slice.

A system for providing network function (NF) discovery service enhancements includes a consumer NF and a plurality of producer NFs supporting network services. The system also includes a NF repository function (NRF) that is configured to receive, from the consumer NF, a NF discovery request message that requests discovery of a network service hosted by producer NFs in a 5G core network and that includes at least one of a maximum payload size parameter and a profile count limit parameter, to obtain NF profile objects corresponding to producer NFs that host the network service, and in response to determining that the consumer NF is configured to support conditional limit features based on the at least one of the maximum payload size parameter and the profile count limit parameter, to provide to the consumer NF a number of the NF profile objects that adheres to the at least one of the maximum payload size parameter and the profile count limit parameter indicated in the NF discovery request message.

According to another aspect of the subject matter described herein, a system that further includes the consumer NF indicating support of the conditional limit features in a NF register message during a registration service operation.

According to another aspect of the subject matter described herein, a system that further includes the consumer NF indicating support of the conditional limit features in the NF discovery request message during a NF discovery service operation.

According to another aspect of the subject matter described herein, a system that further includes the NRF recording the consumer NF as being capable of supporting the conditional limit features in a registration record stored in a local NF profile repository.

According to another aspect of the subject matter described herein, a system that further includes the at least one maximum payload size parameter and the profile count limit parameter included in a header section of the NF discovery request message.

According to another aspect of the subject matter described herein, a system that further includes each of the maximum payload size parameter and the profile count limit parameter further restricted to a specified PLMN and/or network slice.

According to another aspect of the subject matter described herein, a system that is further configured to send to the consumer NF, a NF discovery response message that includes one or more NF profile objects corresponding to NFs that support the network service in a specified PLMN and/or network slice.

The subject matter described herein may be implemented in hardware, software, firmware, or any combination thereof. As such, the terms "function" "node", "engine" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 3 illustrates exemplary contents of a consumer NF discovery request message according to an embodiment of the subject matter described herein.

DETAILED DESCRIPTION

Figure 1:
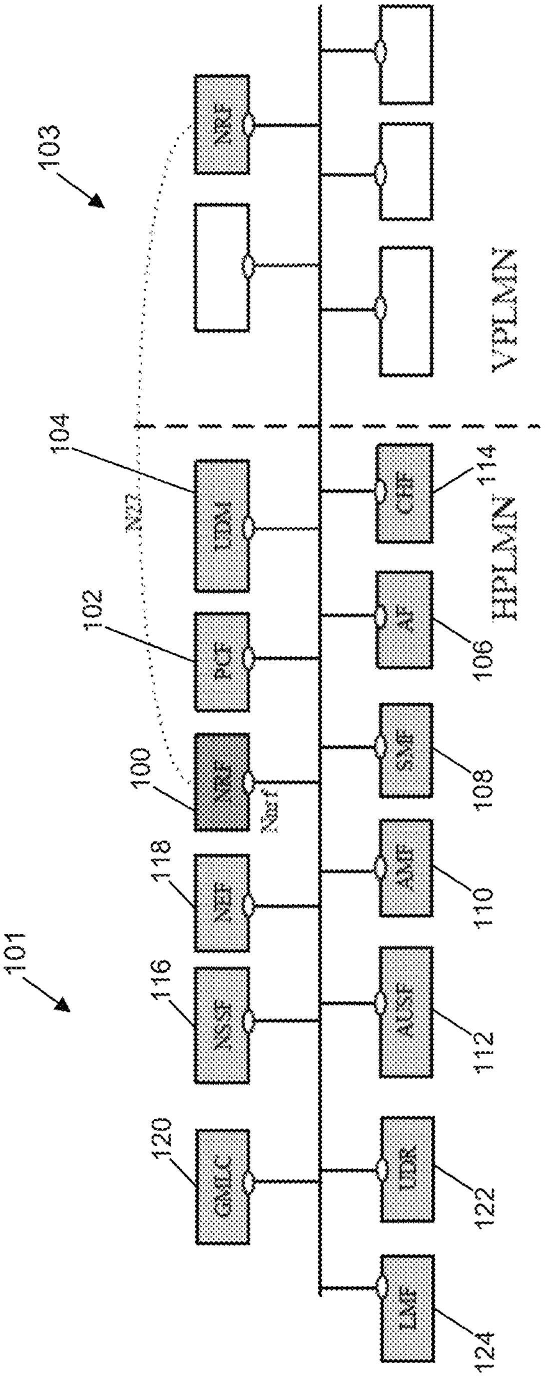
FIG. 1 is a network diagram illustrating an exemplary system architecture of a 5G core network according to an embodiment of the subject matter described herein.

The subject matter described herein relates to methods, systems, and computer readable media for providing network function (NF) discovery service enhancements. FIG. 1 is a block diagram illustrating an exemplary system network architecture corresponding to a 5G core network. The architecture in FIG. 1 includes NF repository function (NRF) 100, which may be located in a home public land mobile network (HPLMN). As described above, NRF 100 may maintain NF profiles of available producer NF service instances and their supported services. NRF 100 may also allow consumer NFs to subscribe to and be notified of the registration of new and/or updated producer NF service instances. As used herein, a NF profile may include a profile object containing the general parameters of the NF instance (e.g., a consumer NF or producer NF) in addition to the parameters of the different services exposed or supported by the NF instance. In some embodiments, the NF profile object is a JavaScript object notation (JSON) data structure defined in 3GPP TS 29.510, Technical Specification Group Core Network and Terminals; 5G System; Network Function Repository Services; Stage 3 (Release 16) V16.0.0 (2019-06). For example, the NF profile definition may include at least one of a fully qualified domain name (FQDN), an Internet protocol (IP) version 4 (IPv4) address or an IP version 6 (IPv6) address. Notably, the requesting consumer NF can use the acquired address information to establish a communication channel with a particular producer NF.

NRF 100 may also support service discovery and selection of producer NFs. Notably, NRF 100 can be configured to receive NF discovery requests from NF instances and subsequently provide the information of the available NF instances that satisfy certain criteria (e.g., support of a given service).

As previously indicated, current 3GPP architecture affords a NFDiscover mechanism that enables consumer NFs (i.e., NF service consumers, source NFs, etc.) to discover the producer NFs (i.e., NF service producers, target NFs, etc.) from the NRF. Although 5G deployments are anticipated to span multiple sites and/or network slices, the current 3GPP specification does not provide a mechanism to select producer NFs from multiple PLMN sites corresponding to specified limits. More specifically, there is no option at the present in which a consumer NF can request or discover producer NF profiles from a particular PLMN or slice that is further limited by i) the number of NF profiles returned and/or ii) the profile payload size of the response message. Further, network functions can register themselves in different NRFs located in different PLMNs. After conducting a NFDiscover operation, a serving NRF in a serving network may return target or producer NF profiles that are hosted across different PLMN(s) and/or network slice(s).

In some embodiments, the disclosed subject matter allows consumer NFs (or source NFs) to discover producer NFs (or target NFs) by permitting consumer NF to establish or define a profile count limit and/or a maximum payload size for the returned NF profiles that are associated with an individual PLMN and/or network slice. For example, consumer NFs and the NRF can be configured to indicate the respective capability of providing support for this feature using "SupportedFeatures" during either the NFRegister service operation and/or the NFDiscover service operation.

In general, NFRegister is a service operation that allows a NF instance to register its NF profile in the NRF. NFRegister includes the registration of the general parameters of the NF instance along with a list of services that are supported or exposed by the NF instance. Further, NFRegister is a service operation that is not permitted to be invoked from an NRF in a different PLMN. The NFRegister service operation can also be used to register a NF in the NRF by providing the NF profile of the requesting NF to the NRF. In response, the NRF marks the requesting NF as available to be discovered by other NFs. The NFRegister service operation is also used to register new services associated to an existing NF instance. The service operation can also be used to register NRF information in another NRF, which can be for forwarding or redirecting service discovery request messages.

In other embodiments, the NF registration service operation supported by the NRF allows a registering consumer NF to subscribe for notification of newly registered NF instances (e.g., producer NFs) along with their NF services. In some embodiments, the NFRegister message sent by the NF service consumer comprises a HTTP PUT request that is directed to the resource URI representing the NF instance. The URI is determined by the NF instance. Notably, the NF register message includes an identification variable (e.g., "nfInstanceID") that is corresponds to the NF service consumer and is globally unique within the PLMN of the NRF where the consumer NF is being registered. Further, the payload body of the PUT request message will contain a representation of the NF instance to be created.

In some embodiments, NRF 100 is further configured to support a NFDiscover service operation. Notably, the NFDiscover service operation allows a network function instance to discover services that are offered by other network function instances by querying the local NRF. In particular, the NFDiscover service operation involves a response message sent to a NF service consumer that provides an IP address or a fully qualified domain name (FQDN) of the producer NF instance or service that matches certain input criteria provided by the NF service consumer. Specifically, the NFDiscover service operation can be initiated by a NF service consumer (e.g., source NF) that is requesting to discover NF instances (e.g., target NFs or producer NFs) that are located in the same serving PLMN or in a different PLMN.

In particular, the NRF can be configured to return, in response to a NF discovery request, a NF discovery response that includes NF profiles belonging to a specified PLMN/slice as requested by the consumer NF. Further, the NRF may limit the number of NF profiles that are provided to the consumer NF by one or more of a maximum payload size and/or a profile count limit (i.e., explained in greater detail below). In some embodiments, the consumer NF is configured to indicate its ability to support this functionality by adding a custom header in the initial NFDiscover service operation message along with parameters that specify the limits pertaining to the maximum payload size and the number of NF profiles (e.g., profile count limit). In the scenario where the consumer NF does not support this functionality, the consumer NF will not add a custom header in the NF discovery service operation message.

More specifically, the NFDiscover service operation is configured to discover a set of producer NF instances and their associated service instances that satisfy a number of input discovery request parameters. These producer NF instances and services are represented by NF profiles that are currently registered in the NRF. In some embodiments, the NFDiscover service operation comprises an HTTP GET request message that is sent by the NF service consumer to a resource URI "nf_instances" collection resource. In response to receiving the NFDiscover request message, the NRF may return a discovery response message, which may include an HTTP OK message. The response body of the discovery response message may specify i) a validity period that establishes how long the search result can be cached by the NF service consumer and ii) a plurality or array of NF profile objects that satisfy the search filter criteria (e.g., all of the NF instances that offer a certain NF service name) indicated in the original NFDiscover request message. As indicated above, in some embodiments the discovery response message sent by the NRF only includes producer NF profiles that adhere to the maximum payload size threshold and/or a profile count limit threshold (as described in further detail in the description below related to FIG. 2). Furthermore, the NF profile objects that are returned in a successful discovery response message can contain generic and specific data of each NF instance.

In some embodiments, the consumer NF may initially indicate the support of "conditional limit features" in a NF register service operation message that is directed toward the NRF. For example, the conditional limit feature attribute may be present in a NF register message sent from the consumer network function. Moreover, since the NF discovery message may be communicated independently before the NF register message in some scenarios, the consumer NF can also be configured to indicate its capability of supporting the conditional limit feature attribute in the NF discovery service operation. For example, the consumer NF can identify the NRF of its capability to support the conditional limit feature by including an indication in an initial NF discovery service request message.

After receiving indication that the requesting consumer NF supports the conditional limit feature (either by the NF register message or the NF discovery request message), the NRF registers the consumer NF as being capable of receiving response messages that includes NF profile information that adheres to the conditional limit feature. In some embodiments, the NRF may store an identifier of the consumer NF as a data entry in a conditional limit feature database or registry.

For example, the consumer NF can send to the NRF a NF discovery request message that contains the specified conditional limit parameters. In some embodiments, the NF discovery service message can include at least one of a maximum payload size parameter and a profile count limit parameter. Notably, these conditional limit parameters can be included in a header of the NF discovery request message sent to the NRF. After receiving the NF discovery request message, the NRF can be configured to utilize a discovery manager engine (DME) (shown in FIG. 2) to execute a NFDiscover service operation procedure that obtains the relevant producer NF profiles corresponding to the producer NFs (or target network functions) that host or expose a desired network service.

In some embodiments, the DME can access a local NF profile repository that stores a plurality of NF profile objects. Notably, the NRF retrieves all of the NF profiles that meet the search criteria, such as a network service supported in the PLMN and/or slice. After acquiring all the relevant NF profiles, the discovery manager engine then determines whether the requesting consumer NF supports the conditional limit feature. In some embodiments, the discovery manager engine can access the conditional limit feature registry that includes a list of consumer NFs that have previously registered and indicated the ability to support the conditional limit feature. If the discovery manager engine determines that the requesting consumer NF is able to support conditional limit features, the discovery manager engine will generate a NF discovery response that includes a plurality of NF profiles that adheres to the maximum payload size parameter and/or profile count limit parameter that was requested by the consumer NF in the NF discovery request message for each PLMN and/or slice.

Returning to FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UE) that seek access to the 5G core network (e.g., via a radio access network).

FIG. 1 further illustrates a network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. In some embodiments, NEF 118 performs similar functions to the service capability exposure function (SCEF) in 4G networks.

Figure 2:
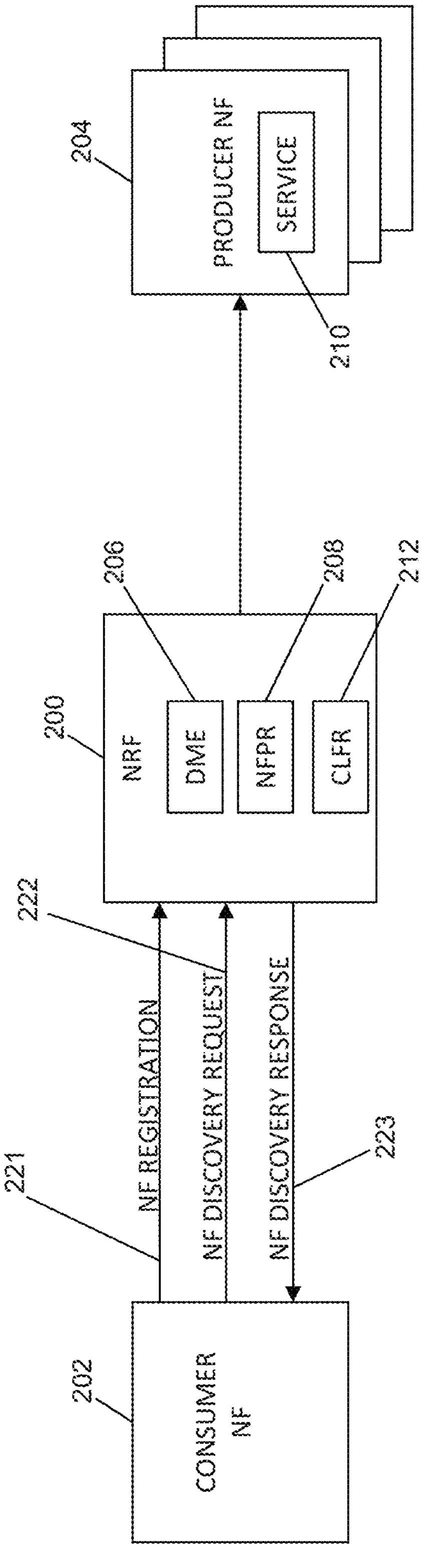
FIG. 2 is a block diagram illustrating 5G network functions connected via a NF repository function (NRF) node according to an embodiment of the subject matter described herein.

FIG. 2 is a block diagram illustrating 5G network functions connected to an NRF node according to an embodiment of the subject matter described herein. In some embodiments, consumer NF 202 is configured to conduct an initial NF registration service operation that serves to indicate that consumer NF 202 is configured to operate using the conditional limit feature(s). For example, consumer NF 202 can send a NF register message 221 to the NRF 200 that indicates the consumer NF's configuration to utilize conditional limit feature support. As shown in FIG. 2, NRF 200 is configured to host a discovery manager engine (DME) 206, a NF profile repository (NFPR) 208, and a local conditional limit feature (CLF) registry 212. In response to receiving the NF register message 221, NRF 200 is configured to create a NF registration record that indicates consumer NF 202 as being a network function that is configured to utilize conditional limit features. In some embodiments, this registration record is stored in CLF registry 212 associated with NRF 200. Likewise, NRF 200 is configured to utilize NFPR 208 as storage for maintaining NF profiles of available producer NF instances and their respective supported services. In some embodiments, a producer NF can register its NF profile and/or network services 210 with NRF 200. The NRF 200 can then store the NF profile of the registered producer NF in NFPR 208. Notably, in order to communicate with a producer NF, a consumer NF (or source NF) must obtain the corresponding NF profile from NRF 100.

After the registration process of the consumer NF is conducted, consumer NF 202 may subsequently send a NF discovery request message 222 to NRF 200. In particular, consumer NF 202 can send a NF discovery request message that requests discovery of the producer NFs (e.g., producer NFs 204) that provide a particular network service (e.g., network service 210) in a specified PLMN and/or slice. The NF discovery request message 222 also indicates a maximum payload size parameter and/or a profile count limit parameter associated with one or more PLMNs and/or slices. Notably, the maximum payload size parameter can be represented by a numerical threshold value that indicates the largest total size (e.g., profile payload size in bytes) of NF profile object results that NRF 200 can include in a corresponding NF discovery response message (e.g., discovery response message 223 as shown in FIG. 2). Similarly, the profile count limit parameter can be represented by a numerical threshold value that indicates the maximum total number of NF profile objects (for each PLMN and/or slice) that NRF 200 can include in a corresponding NF discovery response message. As such, consumer NF 202 (or source NF) can utilize these two parameters to limit the payload size and/or number of NF profiles that the consumer NF will receive from NRF 200 for each PLMN and/or network slice in a single NF discovery response message.

In response to receiving the NF discovery request message from consumer NF 202, NRF 200 initiates the NF discovery procedure in order to obtain the relevant NF profiles of different target or producer NFs (i.e., producer NFs that provide the network service requested by the consumer NF in the discovery request message 222). For example, NRF 200 can execute the NF discovery procedure described in the TS 29.510 specification. After acquiring all of the relevant NF profiles of the producer NFs (which host or expose the requested network service), NRF 200 determines whether the requesting consumer NF supports the conditional limit feature. In some embodiments, NRF 200 will access its local CLF registry 212 for the requesting consumer NF (e.g., utilizing an identifier corresponding to consumer NF 202 to cross-reference the registration record entries in CLF registry 212). If the requesting consumer NF is found to not support the conditional limit features, NRF 200 will add all of the discovered NF profiles as requested per the discovery request message. However, if the requester consumer NF is determined to support the conditional limit features, NRF 200 will only add the discovered NF profiles in accordance with the maximum payload size parameter and/or the profile count limit parameter based on PLMN and/or slice as specified in the NF discovery request message 222 sent by consumer NF 202. As shown in FIG. 2, NRF 200 generates and sends the discovery response message 223, which contains the NF profile objects to consumer NF 202.

FIG. 3 illustrates contents of an exemplary consumer NF discovery request message according to an embodiment of the subject matter described herein. For example, discovery request message 300 may include a maximum payload size parameter section 302 and a maximum profile count limit parameter section 304. In some embodiments, each of maximum payload size parameter section 302 and maximum profile count limit parameter section 304 includes a list of a plurality of PLMNs and/or slices.

For example, section 302 lists each specific PLMN by its MCC identifier and MNC identifier. The MCC and MNC identifiers are used by the requesting consumer NF to indicate the specific PLMN(s) containing NF profiles corresponding to the network services that the consumer NF (or source NF) is interested.

Section 302 also includes single-network slice selection assistance information (S-NSSAI) parameter. Notably, the S-NSSAI includes two components: a SST parameter and a SD parameter. The SST parameter identifies a slice/service type and the SD parameter identifies the slice differentiator. Likewise, the SST and SD parameters are used by the requesting consumer NF to specify the specific network slice(s) that the consumer NF is interested in receiving NF profiles. Lastly, section 302 includes a payload size parameter that indicates the maximum payload size limit in bytes of the NF profiles (that are to be returned to the consumer NF) associated with the PLMN and/or slice. For example, section 302 specifies that the requesting consumer NF is establishing a maximum size limit of 1000 kilobytes for matching NF profiles with the PLMN and slice combinations identified by PLMN '100-20' and slice '10-2' i) MCC: 100 and MNC: 20 and ii) SST: 10 and SD: 2. Moreover, section 302 further specifies that the requesting consumer NF is establishing a maximum size limit of 124 kilobytes of NF profiles from the PLMN and slice combination identified by PLMN '200-10' and slice '20-3' (i.e., i) MCC: 200 and MNC: 10 and ii) SST: 20 and SD:3).

Section 304 of discovery request message 300 includes a profile count limit list that specifies a maximum number of NF profiles associated with one or more PLMNs and/or slices. For example, section 304 specifies that the requesting consumer NF is establishing a limit of two (2) NF profiles from the PLMN and slice combination identified by PLMN '100-20' and slice '10-2' (i.e., i) MCC: 100 and MNC: 20 and ii) SST: 10 and SD: 2). Section 304 further specifies that the requesting consumer NF is establishing a limit of one NF profile from the PLMN and slice combination identified by PLMN '200-10' and slice '20-3' (i.e., i) MCC: 200 and MNC: 10 and ii) SST: 20 and SD:3). Upon obtaining the producer NF profile objects in response to receiving the discovery request message, the NRF will determine whether the requesting consumer NF is registered as being capable of supporting conditional limit features. For example, the NRF may cross reference the registration record entries of a CLF registry database with an identifier corresponding to the requesting consumer NF to determine whether that consumer network function is registered. In the event requesting consumer network function is registered as supporting conditional limit features, the NRF obtains network profiles that pertain to the requested network service and adhere to the limitations/parameters specified in the NF discovery request message. For example, the NRF will provide a single NF profile of a producer network function that is located in the PLMN identified by '200-10' (e.g., MCC: 200 and MNC: 10) and the slice identified by '20-3' (e.g., SST: 20 and SD:3). In some embodiments, the NRF will generate a discovery sponsor message that includes NF profile objects adhering to this conditional limit feature information. Although FIG. 3 illustrates the use of both the PLMN and a slice, other embodiments of the discovery request message can include either only PLMN only slices without departing from the scope of the disclosed subject matter.

Figure 4:
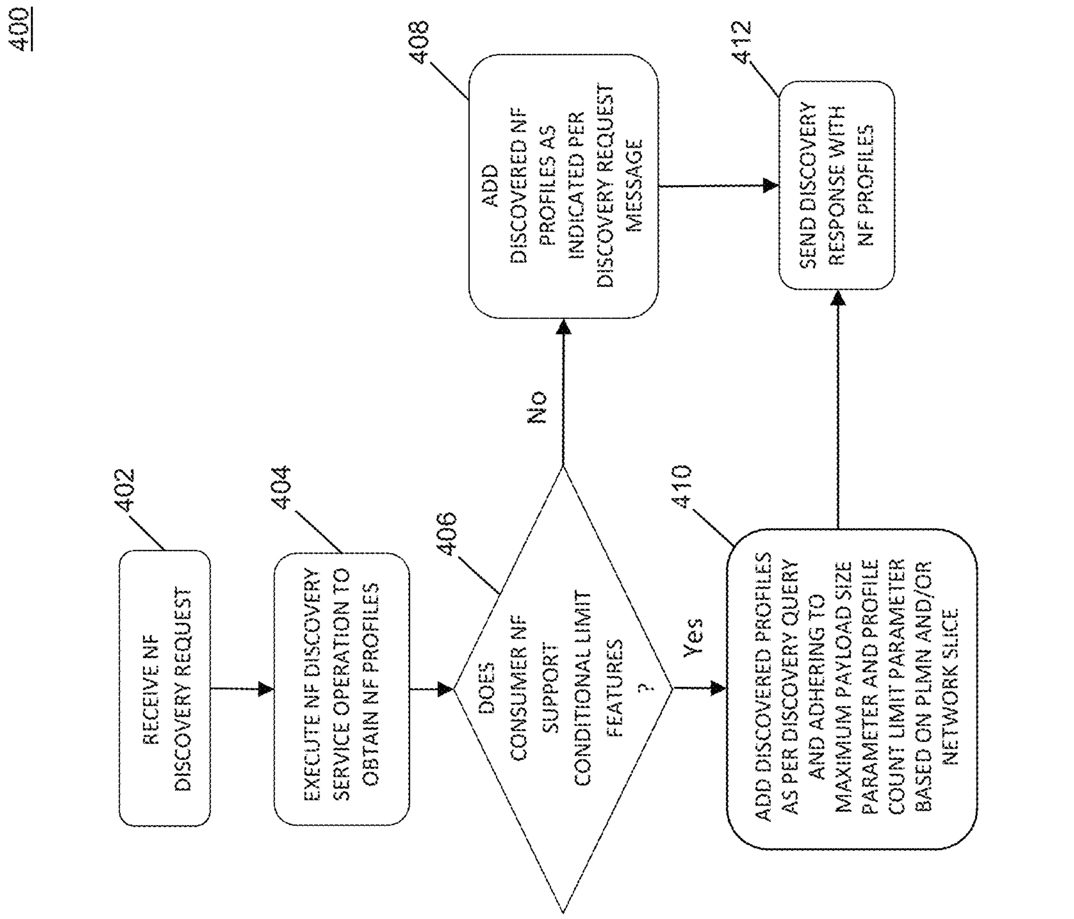
FIG. 4 is a flow chart illustrating an exemplary method for responding to an network function discovery request according to an embodiment of the subject matter described herein.

FIG. 4 is a flow chart illustrating an exemplary method for providing NF discovery service enhancements. In some embodiments, method 400 includes an algorithm and/or software process that is stored in memory of an NRF and subsequently executed by one or more hardware processors of the NRF (or a hardware based network element hosting and/or supporting the NRF). In block 402, a NF discovery request message is received. In some embodiments, a NF discovery request message is received by a NRF from a consumer NF requesting discovery of producer NFs in a particular PLMN and/or slice that are hosting or exposing a network service that is of interest to the consumer NF. More specifically, the NF discovery request message serves as a request directed to a local NRF by a consumer NF to discover network services that are offered by other NF instances in the 5G core network. In some embodiments, the NF discovery request message is an HTTP GET message. In some embodiments of the disclosed subject matter the NF discovery request message can include a maximum payload size parameter and a profile count limit parameter that serves to limit the returned NF profiles that are associated with the producer NFs that are located in a particular PLMN and/or network slice.

In block 404, the NRF executes the NF discovery service operation. In some embodiments, the NRF is configured to execute the NFDiscover procedure specified in the TS29.510 standard in order to obtain NF profiles corresponding to the producer NFs that provide the network service requested by the consumer NF in block 402. In some embodiments, the NRF accesses a NF profile repository containing a list of NF profiles corresponding to producer NFs that have previously registered with the NRF. More specifically, the NRF accesses the NF profile repository to acquire all NF profile objects associated with producer NFs that host, expose, and/or support the network service requested by the consumer NF.

In block 406, the NRF makes a determination as to whether the consumer NF supports conditional limit features or not. In some embodiments, the NRF queries the CLF registry (in the manner described above with regard to FIG. 2) to determine whether the stored registration record data indicates that the requesting consumer NF as previously registered (e.g., via NFRegister service operation) as being capable of supporting the conditional limit feature. In some embodiments, the consumer NF can have previously registered either using the NF registration service operation or using NF discovery service operation. In the event the NRF determines that the consumer NF does not support the conditional limit features, method 400 proceeds to block 408. Otherwise, method 400 continues to block 410.

In block 408, the NRF determines that the consumer NF does not support conditional limit features. In response to such a determination, the NRF will then generate a NF discovery response message that includes all of the NF profiles that pertain to the consumer NF's original discovery request message criteria (e.g., exposed network services hosted by producer NFs in a particular PLMN and/or slice). Notably, the NRF includes all of the NF profiles that it obtains in the NF discovery response message.

In block 410, the NRF determines that the consumer NF does support conditional limit features. In some embodiments the NRF can utilize an identifier corresponding to the consumer NF and cross reference that identifier with registration record entries contained in the CLF registry. In response to making this determination, the NRF will then generate a NF or response message that includes a number of NF profiles (e.g., obtained in block 404) that pertain to the consumer NF's original discovery request message criteria while still adhering to the conditional limit features (e.g., maximum payload size parameter and/or a profile count limit parameter) specified in the discovery request message originally sent to the NRF.

In block 412, a discovery response message including the NF profiles is sent. Notably, the discovery response message generated in either block 408 or block 410 is sent by the NRF to the consumer NF in response to the original received NF discovery request message (e.g., discovery request message received in block 402).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing network function (NF) discovery service enhancements, the method comprising:

receiving, by a NF repository function (NRF) from a consumer NF, a NF discovery request message that requests discovery of a network service hosted by producer NFs in a 5G core network and includes at least one of a maximum payload size parameter and a profile count limit parameter;

obtaining, by the NRF, NF profile objects corresponding to producer NFs that host the network service; and in response to determining that the consumer NF is configured to support conditional limit features based on the at least one of the maximum payload size parameter and the profile count limit parameter, providing by the NRF to the consumer NF, a number of the NF profile objects that adheres to the at least one of the maximum payload size parameter and the profile count limit parameter indicated in the NF discovery request message.

2. The method of claim 1 wherein the consumer NF indicates support of the conditional limit features in a NF register message during a NF registration service operation.

3. The method of claim 1 wherein the consumer NF indicates support of the conditional limit features in the NF discovery request message during a NF discovery service operation.

4. The method of claim 1 wherein the NRF records the consumer NF as being capable of supporting the conditional limit features in a registration record stored in a local conditional limit features repository.

5. The method of claim 1 wherein at least one of the maximum payload size parameter and the profile count limit parameter is included in a header section of the NF discovery request message.

6. The method of claim 1 wherein each of the maximum payload size parameter and the profile count limit parameter is further restricted to a specified public land mobile network (PLMN) and/or network slice.

7. The method of claim 1 comprising sending, by the NRF to the consumer NF, a NF discovery response message that includes one or more NF profile objects corresponding to NFs that support the network service in a specified PLMN and/or network slice.

8. A system for providing network function (NF) discovery service enhancements, the system comprising:

a consumer NF;

a plurality of producer NFs hosting network services; and a NF repository function (NRF) that is configured to receive, from the consumer NF, a NF discovery request message that requests discovery of a network service hosted by producer NFs in a 5G core network and that includes at least one of a maximum payload size parameter and a profile count limit parameter, to obtain NF profile objects corresponding to producer NFs that host the network service, and in response to determining that the consumer NF is configured to support conditional limit features based on the at least one of the maximum payload size parameter and the profile count limit parameter, to provide to the consumer NF a number of the NF profile objects that adheres to the at least one of the maximum payload size parameter and the profile count limit parameter indicated in the NF discovery request message.

9. The system of claim 8 wherein the consumer NF indicates support of the conditional limit features in a NF register message during a NF registration service operation.

10. The system of claim 8 wherein the consumer NF indicates support of the conditional limit features in the NF discovery request message during a NF discovery service operation.

11. The system of claim 8 wherein the NRF records the consumer NF as being capable of supporting the conditional limit features in a registration record stored in a local conditional limit features repository.

12. The system of claim 8 wherein at least one of the maximum payload size parameter and the profile count limit parameter is included in a header section of the NF discovery request message.

13. The system of claim 8 wherein each of the maximum payload size parameter and the profile count limit parameter is further restricted to a specified public land mobile network (PLMN) and/or network slice.

14. The system of claim 8 wherein the NRF is further configured to send to the consumer NF a NF discovery response message that includes one or more NF profile objects corresponding to NFs that support the network service in a specified PLMN and/or network slice.

15. A non-transitory computer readable medium having stored thereon executable instructions that when executed by a processor of a computer control the computer to perform steps comprising:

receiving, by a NF repository function (NRF) from a consumer NF, a NF discovery request message that requests discovery of a network service hosted by producer NFs in a 5G core network and includes at least one of a maximum payload size parameter and a profile count limit parameter;

obtaining, by the NRF, NF profile objects corresponding to producer NFs that host the network service; and in response to determining that the consumer NF is configured to support conditional limit features based on the at least one of the maximum payload size parameter and the profile count limit parameter, providing by the NRF to the consumer NF, a number of the NF profile objects that adheres to the at least one of the maximum payload size parameter and the profile count limit parameter indicated in the NF discovery request message.

16. The non-transitory computer readable medium of claim 15 wherein the consumer NF indicates support of the conditional limit features in a NF register message during a NF registration service operation.

17. The non-transitory computer readable medium of claim 15 wherein the consumer NF indicates support of the conditional limit features in the NF discovery request message during a NF discovery service operation.

18. The non-transitory computer readable medium of claim 15 wherein the NRF records the consumer NF as being capable of supporting the conditional limit features in a registration record stored in a local conditional limit features repository.

19. The non-transitory computer readable medium of claim 15 wherein at least one of the maximum payload size parameter and the profile count limit parameter is included in a header section of the NF discovery request message.

20. The non-transitory computer readable medium of claim 15 wherein each of the maximum payload size parameter and the profile count limit parameter is further restricted to a specified public land mobile network (PLMN) and/or network slice.

* * * * *